United States Patent
Giladi

(10) Patent No.: US 9,646,162 B2
(45) Date of Patent: May 9, 2017

(54) DYNAMIC ADAPTIVE STREAMING OVER HYPERTEXT TRANSFER PROTOCOL SERVICE PROTECTION

(71) Applicant: Futurewei Technologies, Inc., Plano, TX (US)

(72) Inventor: Alexander Giladi, Princeton, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 431 days.

(21) Appl. No.: 14/248,074

(22) Filed: Apr. 8, 2014

(65) Prior Publication Data

US 2014/0310518 A1    Oct. 16, 2014

Related U.S. Application Data

(60) Provisional application No. 61/810,501, filed on Apr. 10, 2013.

(51) Int. Cl.
*H04L 29/06* (2006.01)
*G06F 21/60* (2013.01)
(Continued)

(52) U.S. Cl.
CPC ........ *G06F 21/606* (2013.01); *H04L 63/0428* (2013.01); *H04L 65/4084* (2013.01);
(Continued)

(58) Field of Classification Search
CPC .............. G06F 21/606; H04N 21/4405; H04L 63/0428

See application file for complete search history.

(56) References Cited

U.S. PATENT DOCUMENTS

2008/0065548 A1*   3/2008   Muijen ................ H04N 7/1675
                                                                                705/51
2009/0208006 A1*   8/2009   Candelore .......... H04N 21/2347
                                                                                380/200

(Continued)

OTHER PUBLICATIONS

ISO/IEC CD 23009-4 Information technology—Dynamic adaptive streaming over HTTP (DASH)—Part 4: Segment encryption and authentication, Date: May 12, 2012.*

(Continued)

*Primary Examiner* — Jeffrey Pwu
*Assistant Examiner* — William Corum, Jr.
(74) *Attorney, Agent, or Firm* — Conley Rose, P.C.

(57) ABSTRACT

A method comprising encrypting a segment in response to receiving a segment request to generate an encrypted segment, and sending the encrypted segment, wherein encrypting the segment comprises encrypting a data content segment and a non-media segment in accordance with information provided in a dynamic adaptive streaming over hypertext transfer protocol (HTTP) (DASH) media presentation description (MPD), and wherein encrypting the segment generates an encrypted data content segment and an encrypted non-media segment. A method comprising sending a segment request, receiving an encrypted segment, wherein the encrypted segment comprises an encrypted data content segment and an encrypted non-media segment, and decrypting the encrypted segment in accordance with information provided in a DASH MPD to generate a data content segment and a non-media segment, wherein the non-media segment comprises a non-playable media.

21 Claims, 6 Drawing Sheets

(51) Int. Cl.

| | |
|---|---|
| *H04N 21/4405* | (2011.01) |
| *H04N 21/2347* | (2011.01) |
| *H04N 21/6334* | (2011.01) |
| *H04N 21/643* | (2011.01) |
| *H04N 21/84* | (2011.01) |
| *H04N 21/845* | (2011.01) |
| *H04L 29/08* | (2006.01) |

(52) U.S. Cl.
CPC ............ *H04L 65/608* (2013.01); *H04L 67/02* (2013.01); *H04N 21/2347* (2013.01); *H04N 21/4405* (2013.01); *H04N 21/63345* (2013.01); *H04N 21/64322* (2013.01); *H04N 21/84* (2013.01); *H04N 21/8456* (2013.01)

(56) References Cited

U.S. PATENT DOCUMENTS

| | | | | |
|---|---|---|---|---|
| 2010/0262991 | A1* | 10/2010 | Pak | G06F 21/10 725/31 |
| 2012/0017282 | A1* | 1/2012 | Kang | G06F 21/10 726/26 |
| 2012/0233345 | A1* | 9/2012 | Hannuksela | 709/231 |
| 2012/0259994 | A1* | 10/2012 | Gillies | H04L 12/1881 709/231 |
| 2013/0042100 | A1 | 2/2013 | Bouazizi et al. | |
| 2013/0322628 | A1* | 12/2013 | Rhyu et al. | 380/255 |
| 2014/0189066 | A1* | 7/2014 | Gholmieh et al. | 709/219 |
| 2015/0350205 | A1* | 12/2015 | Oyman | H04L 63/126 726/7 |
| 2016/0198202 | A1* | 7/2016 | Van Brandenburg | H04N 21/26258 725/31 |

OTHER PUBLICATIONS

"Information technology—Dynamic adaptive streaming over HTTP (DASH)—Part 1: Media presentation description and segment formats", International Standard, ISO/IEC 23009-1, First edition, Apr. 1, 2012, 134 pages
Giladi, A., et al., "International Organisation for Standardisation—Coding of Moving Pictures and Audio", ISO-IEC FDIS 23009-4, Jan. 2013, 34 pages.
"Information technolog—MPEG systems technologies—Part 7: Common encryption in ISO base media file format files", ISO/IEC JTC 1/SC 29 N, ISO/IEC CD 23001-7 2nd Edition, ISO/IEC JTC 1/SC 29/WG 11, Jul. 22, 2011, 20 pages.
"Information technology—Coding of audio-visual objects—Part 12: ISO base media file format", ISO/IEC 14496-12, Second edition, Corrected version, Oct. 1, 2005, 94 pages.
"Information technology—Generic coding of moving pictures and associated audio information: Systems", ISO/IEC 13818-1, Second edition, Dec. 1, 2000, 174 pages.
"Extensible Markup Language (XML) 1.0 (Fifth Edition)," W3C Recommendation, http://www.23.org/TR/xml, Nov. 26, 2018, 37 pages.

* cited by examiner

DYNAMIC ADAPTIVE STREAMING OVER HYPERTEXT TRANSFER PROTOCOL SERVICE PROTECTION

CROSS-REFERENCE TO RELATED APPLICATIONS

The present application claims benefit of U.S. Provisional Patent Application No. 61/810,501 filed Apr. 10, 2013 by Alexander Giladi and entitled "Service Protection in DASH," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Dynamic adaptive streaming over hypertext transfer protocol (HTTP) (DASH) defines a manifest format, media presentation description (MPD), and segment formats for International Organization for Standardization (ISO) Base Media File Format (ISO-BMFF) and Moving Picture Expert Group (MPEG) Transport Stream under the family of standards MPEG-2, as described in ISO/International Electrotechnical Commission (IEC) 13818-1, titled "Information Technology—Generic Coding of Moving Pictures and Associated Audio Information: Systems."

In order to provide data content protection, data content may be protected or encrypted via a digital rights management (DRM) scheme. DASH is agnostic to DRM and supports DRM signaling schemes and its properties within the MPD. A DRM scheme can be signaled via the ContentProtection descriptor, and an opaque value can be passed within it. MPEG developed two content protection frameworks, Common Encryption (CENC) for ISO-BMFF (ISO/IEC 23001-7) and Segment Encryption and Authentication (draft ISO/IEC 23009-4); also see ISO/IEC 23009-1, titled "Information Technology—Dynamic Adaptive Streaming over HTTP (DASH)—part 1: Media Presentation Description and Segment Formats," all of which are incorporated herein by reference. CENC standardizes which parts of a sample that may be encrypted and how encryption metadata is signaled within a track. This means that, when providing encrypted data content, the DRM module is responsible for delivering the keys to the client, depending on the encryption metadata in the segment. Decryption may be implemented using standard Advanced Encryption Standard (AES) Counter Mode (AES-CTR) or AES-Cipher Block Chaining (AES-CBC) modes. DASH Segment Encryption (DASH-SEA) is agnostic to the segment format and passes encryption metadata via the MPD. For example, the MPD contains information that indicates the key used for decryption of a given segment and how to obtain this key. The baseline system is equivalent to the one defined in HTTP Live Streaming (HLS), with AES-CBC encryption and key transport using HTTP secure (HTTPS).

In order to provide service-level protection, conventional DASH systems may employ HTTPS to provide service-level protection. However, such conventional systems may impose delays due to the full handshake required for each session. Additionally, HTTPS cannot be cached and encryption may need to be done at each content delivery network (CDN) node, rather than at some head-end from which segments are pushed to the CDN nodes. As such, there is a need for a means that improves service-level protection.

SUMMARY

In an embodiment, a method comprising encrypting a segment in response to receiving a segment request to generate an encrypted segment, and sending the encrypted segment, wherein encrypting the segment comprises encrypting a data content segment and a non-media segment in accordance with information provided in a DASH MPD, and wherein encrypting the segment generates an encrypted data content segment and an encrypted non-media segment.

In an embodiment, a method comprising sending a segment request, receiving an encrypted segment, wherein the encrypted segment comprises an encrypted data content segment and an encrypted non-media segment, and decrypting the encrypted segment in accordance with information provided in a DASH MPD to generate a data content segment and a non-media segment, wherein the non-media segment comprises a non-playable media.

In an embodiment, an apparatus comprising a processor, a transmitter unit and a receiver unit coupled to the processor, and a memory device coupled to the processor, wherein the memory device comprises computer executable instructions such that, when executed by the processor, cause the apparatus to send an MPD request and receive an MPD, wherein the MPD comprises a descriptor that signals a method of encrypting a data content segment and a nonmedia segment, a scheme uniform resource name (URN) associated with the method, and an element assigned to the non-media segment, and decrypt an encrypted segment in accordance with the MPD, wherein the encrypted segment comprises an encrypted data content segment and an encrypted non-media segment.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of a DASH apparatus, system, and method of using the same. Particularly disclosed herein are one or more embodiments of a DASH service protection system and method of using the same. In one or more embodiments, the DASH system may be generally configured to provide service-level protection and full segment (e.g., data content segments and non-media segments) encryption and decryption. The service protection may be employed to prevent content modification, to protect operator contributions (e.g., DASH events), and/or to enforce business policies, such as, where a service-level key may be provided upon authenticating a client or user. A DASH system may implement service protection independently or in conjunction with DRM. For example, a DASH system may employ service protection to provide data content protection without requiring DRM or segment encryption. The absence of DRM may provide complexity and/or cost benefits for a DASH apparatus and/or system. Additionally, service protection may be provided independent of the data content being communicated. Alternatively, service protection may be employed to provide additional data content protection, for example, by providing a dual layer encryption (e.g., both content protection and service protection).

Figure 1:
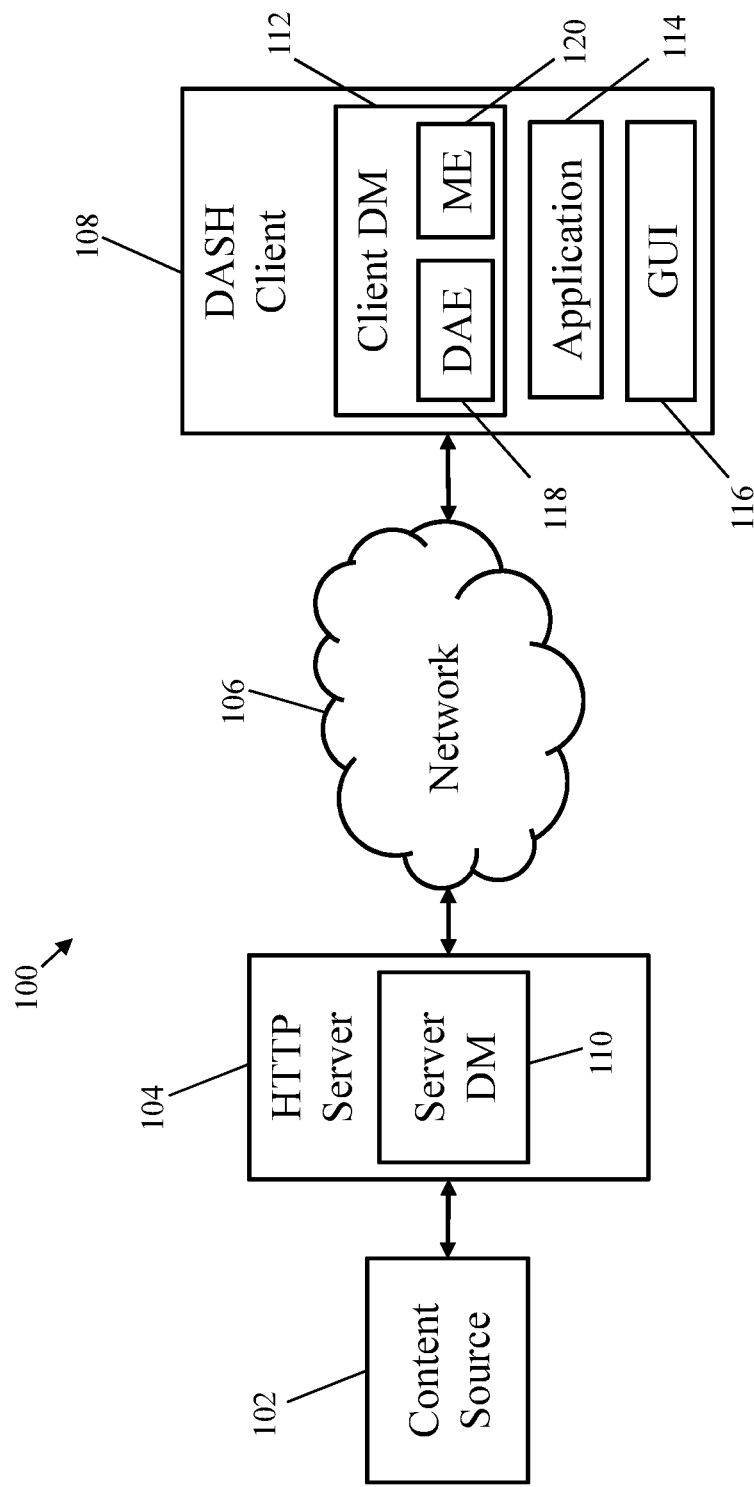
FIG. 1 is a schematic view of an embodiment of a DASH system.

FIG. 1 is a schematic view of an embodiment of a DASH system 100. The DASH system 100 may generally comprise a content source 102, an HTTP server 104, a network 106, and a DASH client 108. In such an embodiment, the HTTP server 104 and the DASH client 108 may be in data communication with each other via the network 106. Additionally, the HTTP server 104 may be in data communication with the content source 102. In an alternative embodiment, the DASH system 100 may further comprise one or more additional content sources, HTTP servers, and/or DASH clients.

The content source 102 may be a media content provider or distributer which may be configured to deliver various media contents to subscribers or users using different encryption and/or coding schemes suited for different devices (e.g., televisions, notebook computers, and mobile handsets). The content source 102 may be configured to support a plurality of media encoders and/or decoders (e.g., codecs), media players, video frame rates, spatial resolutions, bitrates, video formats, or combinations thereof. Media content may be converted from a source or original presentation to various other representations to suit different users.

The HTTP server 104 may be any hardware computer server configured to send and receive data via HTTP. The HTTP server 104 may comprise server DASH modules (DMs) 110 configured to send and receive data via HTTP and according to the DASH standard described in ISO/IEC 23009-1 and 23009-4. The HTTP server 104 may form a portion of a CDN, which may refer to a distributed system of servers deployed in multiple data centers over multiple backbones for the purpose of delivering content. A CDN may comprise one or more HTTP servers.

The DASH client 108 may be any hardware device configured to send and receive data via HTTP. For example, the DASH client 108 may be a notebook computer, a tablet computer, a desktop computer, a mobile telephone, or any other device. The DASH client 108 may comprise a client DM 112, an application 114, and a graphical user interface (GUI) 116. The client DM 112 may be configured to send and receive data via HTTP and according to the DASH standard. The client DM 112 may comprise a DASH access engine (DAE) 118 and a media output (ME) 120. The DAE 118 may be configured as the primary component for receiving raw data from the HTTP server 104 and constructing the data in a format for viewing. For example, the DAE 118 may format the data in MPEG container formats along with timing data, then output the formatted data to the ME 120. The ME 120 may be responsible for initialization, playback, and other functions associated with content and may output that content to the application 114. The application 114 may be a web browser or other application with an interface configured to download and present content. The application 114 may be coupled to the GUI 116 so that a user associated with the DASH client 108 may view the various functions of the application 114. In an embodiment, the application 114 may comprise a search bar so that the user may search for content. For example, if the application 114 is a media player, then the application 114 may comprise a search bar so that the user may input a string of words to search for a movie. The application 114 may present a list of search hits, and the user may select the desired movie from among the hits. Upon selection, the application 114 may send instructions to the client DM 112 for downloading the movie. The client DM 112 may download the movie and process the movie for outputting to the application 114. The application 114 may provide instructions to the GUI 116 for the GUI 116 to display a progress bar showing the temporal progress of the movie. The GUI 116 may be any GUI configured to display functions of the application 114 so that the user may operate the application 114. As described above, the GUI 116 may display the various functions of the application 114 so that the user may select content to download. The GUI 116 may then display the content for viewing by the user.

The network 106 may be any network configured to provide data communication between the HTTP server 104 and the DASH client 108. For example, the network 106 may be the Internet, a mobile telephone network, or any other network. The network 106 may allow communication along wired or wireless channels.

Figure 2:
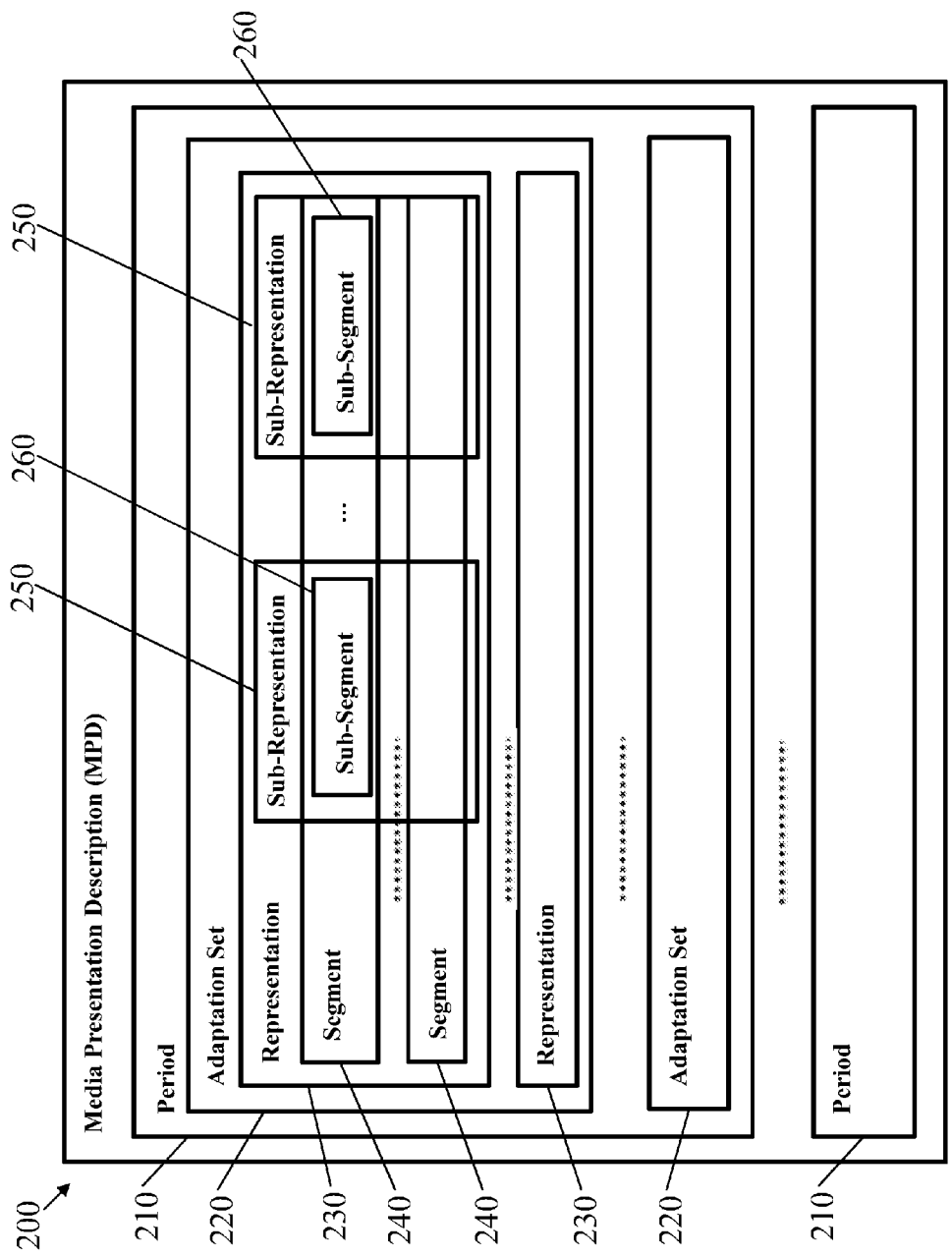
FIG. 2 is a schematic diagram of an embodiment of an MPD.

FIG. 2 is a schematic diagram of an MPD 200 for a service-level protection scheme. In an embodiment, an HTTP server (e.g., HTTP server 104 as shown in FIG. 1) may generate an MPD 200 to provide and/or enable service protection encryption (i.e., service-level encryption). The MPD 200 is a hierarchical data model. In accordance with ISO/IEC 23009-1, the MPD 200 may be referred to as a formalized description for a media presentation for the purpose of providing a streaming service. A media presentation, in turn, may be referred to as a collection of data that establishes a presentation of media content. In particular, the MPD 200 may define formats to announce HTTP uniform resource locators (URLs), or network addresses, for downloading segments of data content. In one embodiment, the MPD 200 may be an Extensible Markup Language (XML) document. The MPD 200 may comprise a plurality of URLs, and/or metadata, to be used by a DASH client to construct a plurality of URLs, pointing to one or more HTTP servers for downloading segments of data.

The MPD 200 may comprise Period 210, Adaptation Set 220, Representation 230, Segment 240, Sub-Representation 250, and Sub-Segment 260 elements. The Period 210 may be associated with a period of data content. In accordance with ISO/IEC 23009-1, the Period 210 may typically represent a media content period during which a consistent set of encoded versions of the media content is available. In other words, the set of available bitrates, languages, captions, subtitles, etc., does not change during a period. An Adaptation Set 220 may comprise a set of mutually interchangeable Representations 230. A Representation 230 may describe a deliverable encoded version of one or several media content components. The DASH client may switch from representation to representation in order to adapt to network conditions or other factors. The DASH client may determine if it can support a specific Representation 230. If not, then the DASH client may select a different Representation 230 that it can support. A Segment 240 may be referred to as a unit of data associated with a URL. In other words, a Segment 240 may generally be the largest unit of data that can be retrieved with a single HTTP request using a single URL. The DASH client may be configured to download each segment within the selected Representation 230 until the DASH client ceases downloading or until the DASH client selects another Representation 230. Additional details for the Segment 240, the Sub-Representation 250, and the Sub-Segment 260 elements are described in ISO/IEC 23009-1.

The Period 210, Adaptation Set 220, Representation 230, Segment 240, Sub-Representation 250, and Sub-Segment 260 elements describe data. In an MPD, elements and attributes may be similar to those defined in XML 1.0, Fifth Edition, 2008, which is incorporated in its entirety. Elements may be distinguished from attributes by uppercase first letters or camel-casing, as well as bold face, though bold face is removed herein. Each element may comprise one or more attributes, which may be properties that further define the element. Attributes may be distinguished by a preceding @ symbol. For example, the Period 210 may comprise an @start attribute that may specify when on a presentation timeline a period associated with the Period 210 begins.

The disclosed technique may comprise a service protection framework for specifying a DASH client's behavior. The disclosed technique may further comprise new session, event, generic, and URL authentication descriptors using the service protection framework. The service protection framework and the new descriptors may be at the Period 210, Adaptation Set 220, Representation 230, or Sub-Representation 250 level. The service protection framework may specify the DASH client's behavior and may do so for required, group, and optional contexts. The service protection framework may employ existing elements and/or attributes, for example, elements and/or attributes such as those disclosed in ISO/IEC 23009-4. Additionally, the service protection framework may employ new elements and/or attributes.

The service protection framework may employ a descriptor to signal a service protection encryption element. A descriptor may describe how to deploy a component, module, function, or application. In an embodiment, the service protection framework may signal a service protection encryption element using an existing descriptor, such as, EssentialProperty or any other descriptor defined by IS O/IEC 23009 (e.g., IS O/IEC 23009-1 or IS O/IEC 23009-4). In an alternative embodiment, the service protection framework may signal a service protection encryption element using a new descriptor, for example, a ServiceProtection element. In other embodiments, the service protection framework may signal a service protection encryption element using both existing descriptors and new descriptors, for example, by nesting the descriptors. The descriptor may be configured to carry license and key derivation information. In an embodiment where a content protection element is present (e.g., segment encryption), the content protection element may be encapsulated by the service protection element, and thereby provide an additional layer of data content encryption over the content protection element (e.g., a dual layer encryption). In such an embodiment, the service protection would be decrypted first to access and decrypt the encrypted data content segment.

The service protection encryption element may comprise one or more scheme URNs or scheme identifier (ID) uniform resource identifier (URI) attributes associated with service protection encryption. A scheme URN may indicate the location for guidelines and/or definitions associated with the implementation of an element, such as guidelines and/or definitions associated with providing service protection encryption and decryption. For example, a service protection encryption scheme URN may be defined within the descriptor designated for service protection encryption element, for example, as the EssentialProperty@ schemeIdUri property (e.g., schemeIdUri="urn:mpeg:dash:sea:service-protection:2013"). In an additional embodiment, the service protection encryption element may further comprise one or more additional scheme URNs. For example, a content protection scheme URN may be defined within the descriptor designated for service protection encryption. Alternatively, any other suitable scheme URN may be incorporated within the descriptor designated for service protection encryption, as would be appreciated by one of ordinary skill in the art upon viewing this disclosure. The service protection encryption element may further comprise one or more element parameters for non-media segments, such as, an initialization segment, an index segment, a representation index segment, and a bitstream switching segment. A non-media segment may comprise data that does not change between segments, program data, and/or non-playable media. One or more non-media segments may be assigned to a single element parameter (e.g., as a group) and/or assigned to a unique element parameter. The one or more non-media segments may be transported via an HTTP over transport layer security (TLS).

An example of an MPD 200 and associated syntax for service protection encryption is shown in Table 1. In such an example, the HTTP server may provide or generate an MPD describing a media presentation. A service protection encryption element is signaled with an EssentialProperty descriptor within the adaptation set. A service protection encryption scheme URN is provided (e.g., urn:mpeg:dash:sea:service-protection:2013). In such an example, the service protection encryption element comprises segment encryption (e.g., segment encryption as defined by ISO/IEC 23009-4) that is signaled via the segment encryption scheme URN (e.g., urn:mpeg:dash:sea:aes128-cbc:2013). The segment encryption may employ an AES 128-bit CBC encryption and/or any other segment encryption method. In one embodiment, the HTTP server may not provide segment encryption. Additionally in such an example, the service protection encryption element may comprise a CryptoTimeline element (e.g., as defined by IS O/IEC 23009-4) and is configured such that a key and initialization vector (IV) combination changes every eight seconds during a broadcast. In an alternative embodiment, the key and IV combination may change at any other suitable rate during a broadcast, for example, every second, every 10 seconds, every 30 seconds, every minute, every 30 minutes, etc. The CryptoTimeline element may also be configured such that the key and IV combination may not change during a broadcast. In the example of Table 1, non-media segments are contained within a NonMediaEncryption element. Additionally, signaling for the non-media segments may be performed similar to ISO/IEC 23009-4 for segment authentication. For example, the non-media segment URL may be a parameter in a key/IV URL. Such a key/IV URL may be employed to encrypt and decrypt the non-media segments. In an alternative embodiment, a separate explicit element may be provided for each non-media segment (i.e., an index segment, a separate element for initialization segments, etc.).

is not required, method 300 may proceed to step 310. In step 308, if content protection is required, method 300 may perform content protection, such as, segment encryption as defined by ISO/IEC 23009-4 or any other data content encryption method as would be appreciated by one of ordinary skill in the art upon viewing this disclosure. For example, method 300 may employ a key and an IV to encrypt the data content segment. In step 310, method 300

TABLE 1

An example of a service protection MPD

```
<?xml version="1.0" encoding="UTF-8"?>
<MPD xmlns:xsi="http://www.w3.org/2001/XMLSchema-instance"
  xsi:schemaLocation="urn:mpeg:dash:schema:mpd:2011 DASH-MPD.xsd"
  xmlns="urn:mpeg:dash:schema:mpd:2011"
  xmlns:sea="urn:mpeg:dash:schema:sea:2013 sea.xsd"
  id="a1fd4476-3523-4a1d-99e2-472ae55eb343"
  type="dynamic"
  availabilityStartTime="2012-07-07T07:07:07"
  minBufferTime="PT1.4S"
  profiles="urn:mpeg:dash:profile:mp2t-simple:2011"
  maxSegmentDuration="PT2S" minimumUpdatePeriod="PT3600S"
timeShiftBufferDepth="PT240S">
  <BaseURL>http://cdn1.example.com/SomeMovie/</BaseURL>
  <BaseURL>http://cdn2.example.com/SomeMovie/</BaseURL>
  <Period id="42" >
    <AdaptationSet
      mimeType="video/mp2t"
      codecs="avc1.4D401F,mp4a" frameRate="24000/1001"
      segmentAlignment="true" bitstreamSwitching="true"
      startWithSAP="2" >
      <!-- Key/IV combination changes every 8 sec. during the broadcast -->
      <EssentialProperty schemeIdUri="urn:mpeg:dash:sea:service-protection:2013">
        <sea:SegmentEncryption schemeIdUri="urn:mpeg:dash:sea:aes128-cbc:2013" />
        <sea:CryptoTimeline
          numSegments="4"
          ivBase="3859301f1201262e0000000000000000"
          keyUriTemplate="https://example.com/key.cgi?sn=$Number%08d$" />
        <sea:NonMediaEncryption
          keyUrlTemplate= http://example.com/key.cgi?segment_url=$base$
          IV="3859301f1201262e0000000000000000" />
      </EssentialProperty>
      <SegmentTemplate
        media="$RepresentationID$__$Number%08d$.ts"
        bitstreamSwitching="$RepresentationID$-bssw.ts"
        duration="4" startNumber="1"/>
      <Representation id="720kbps" bandwidth="792000" width="640" height="368"/>
      <Representation id="1130kbps" bandwidth="1243000" width="704" height="400"/>
      <Representation id="1400kbps" bandwidth="1540000" width="960" height="544"/>
      <Representation id="2100kbps" bandwidth="2310000" width="1120" height="640"/>
      <Representation id="2700kbps" bandwidth="2970000" width="1280" height="720"/>
      <Representation id="3400kbps" bandwidth="3740000" width="1280" height="720"/>
    </AdaptationSet>
  </Period>
</MPD>
```

Figure 3:
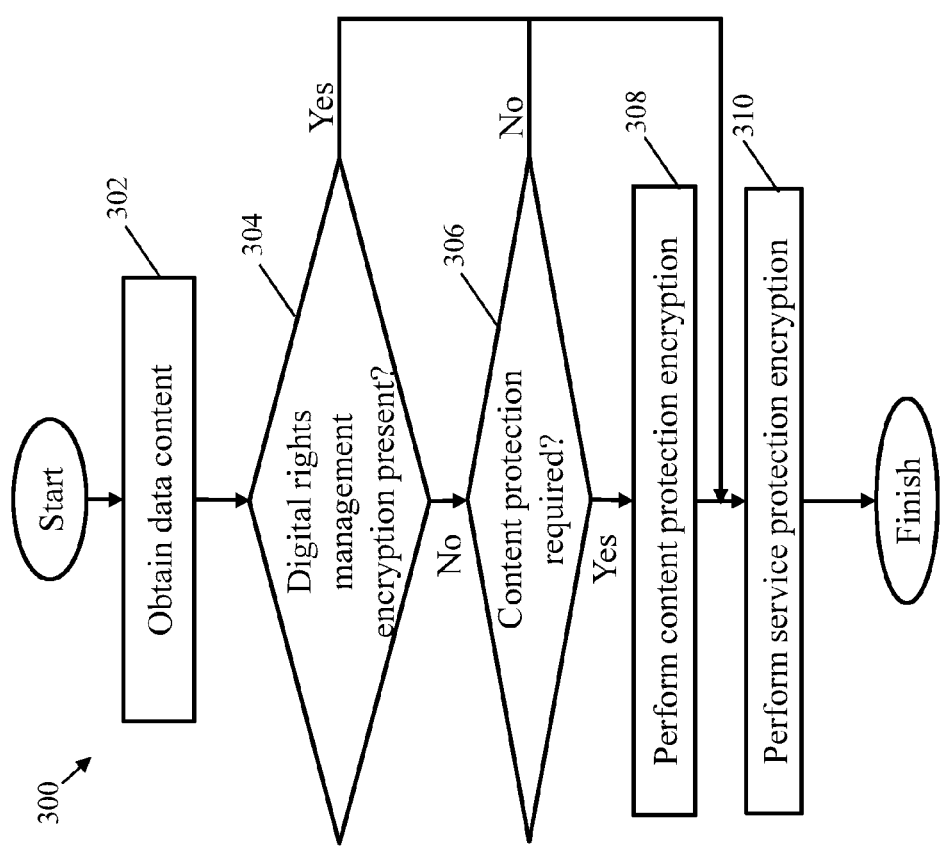
FIG. 3 is a flowchart of an embodiment of an encryption method.

FIG. 3 is a flowchart of an embodiment of an encryption method 300. In an embodiment, an HTTP server (e.g., HTTP server 104 as shown in FIG. 1) may employ the encryption method 300 to generate an encrypted segment (e.g., an encrypted data content segment and an encrypted non-media segment). In step 302, method 300 may obtain data content. For example, method 300 may obtain data content from a content source (e.g., content source 102 as shown in FIG. 1) or from a memory device. In step 304, method 300 may determine if the data content employs DRM protection. Method 300 may determine if a scheme URN indicating DRM protection is present. If DRM protection is provided, method 300 may proceed to step 310. If DRM protection is not provided, method 300 may proceed to step 306. In step 306, method 300 may determine if content protection is required. Method 300 may determine if a scheme URN indicating content protection is present. If content protection may perform service protection encryption. For example, method 300 may use a key and an IV to encrypt (or further encrypt) the data content segment and the non-media segment, and thereby generate an encrypted segment.

Figure 4:
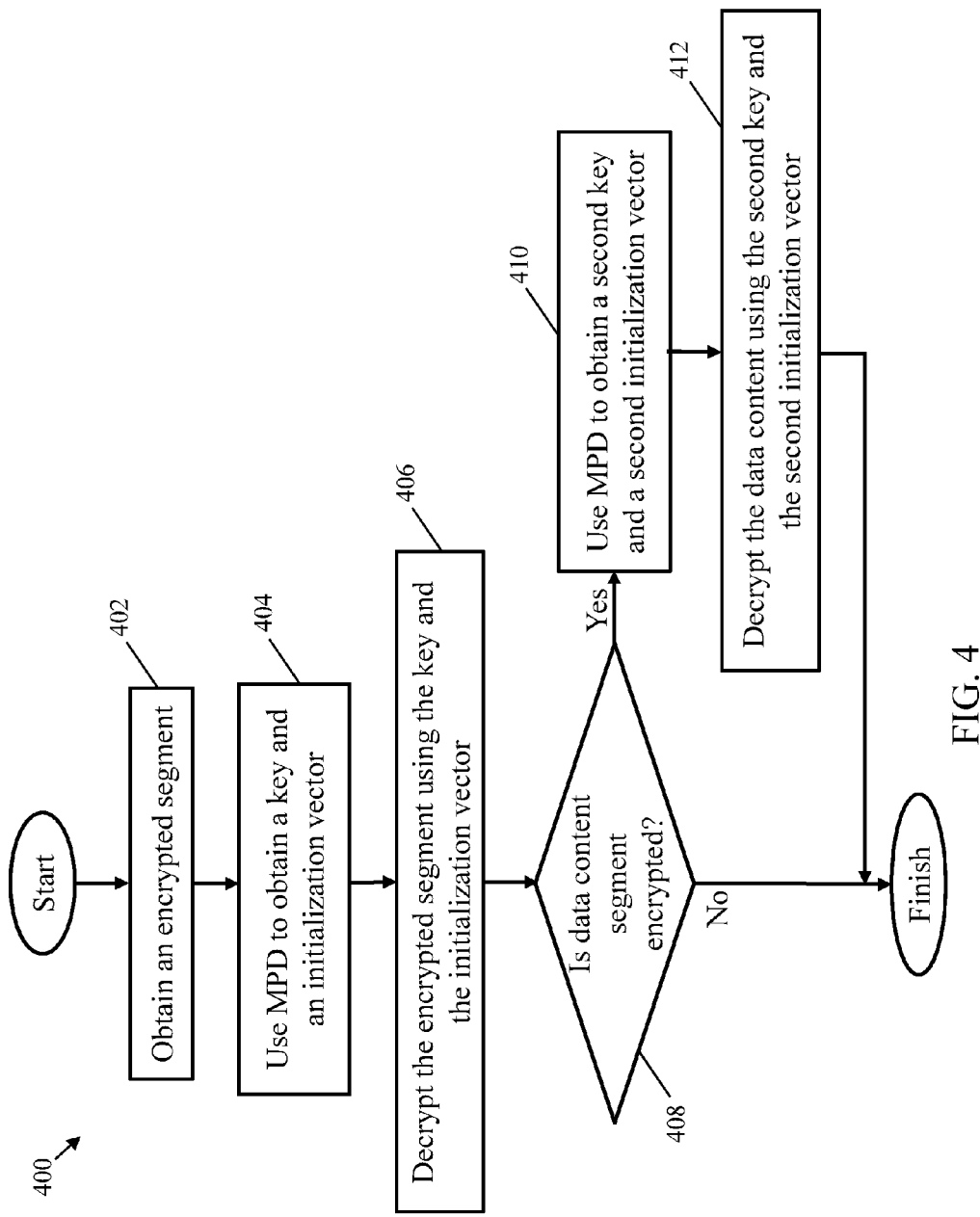
FIG. 4 is a flowchart of an embodiment of a decryption method.

FIG. 4 is a flowchart of an embodiment of a decryption method 400. In an embodiment, a DASH client (e.g., DASH client 108 as shown in FIG. 1) may employ the decryption method 400 to decrypt an encrypted segment in order to access the data content segment and/or non-media segments. In step 402, method 400 may obtain an encrypted segment. For example, method 400 may receive (e.g., download) an encrypted segment from the HTTP server via an HTTP connection. In step 404, method 400 obtains a key and an IV which may be employed for decrypting the encrypted segment. In an embodiment, method 400 may obtain and/or derive a key and an IV as instructed by the MPD. Method 400 may obtain and/or derive the key and the IV via one or more attributes of the service protection encryption element (e.g., a scheme URN, a key URL, an IV URL, a key URL template, or an IV URL template). For example, a key and an IV may be obtained and/or derived as defined by ISO/IEC 23009-4, such as, via a key URL and/or an IV URL. The key and IV may be used to decrypt the service protection encryption. In an additional embodiment, method 400 may obtain and/or derive a second key and a second IV as instructed by the MPD, which may be used to further decrypt any additional data content encryption, for example, content protection, segment encryption, DRM, or the-like. In step 406, method 400 may decrypt the encrypted segment using the key and the initialization vector. For example, method 400 may employ the key and the IV obtained and/or derived from the MPD to decrypt the service protection encryption, and thereby access the non-media segment and the data content segment. In step 408, method 400 may determine if data content segment requires further decryption. If no additional decryption is required, method 400 may terminate. If additional decryption is required, the method may proceed to step 410. In step 410, method 400 may obtain a second key and a second IV, which may be employed for further decrypting of the data content segment. In step 412, method 400 may employ the second key and the second IV obtained and/or derived from the MPD to decrypt any additional data content encryption. Upon completion of decrypting the non-media segment and the data content segment, method 400 may terminate.

Figure 5:
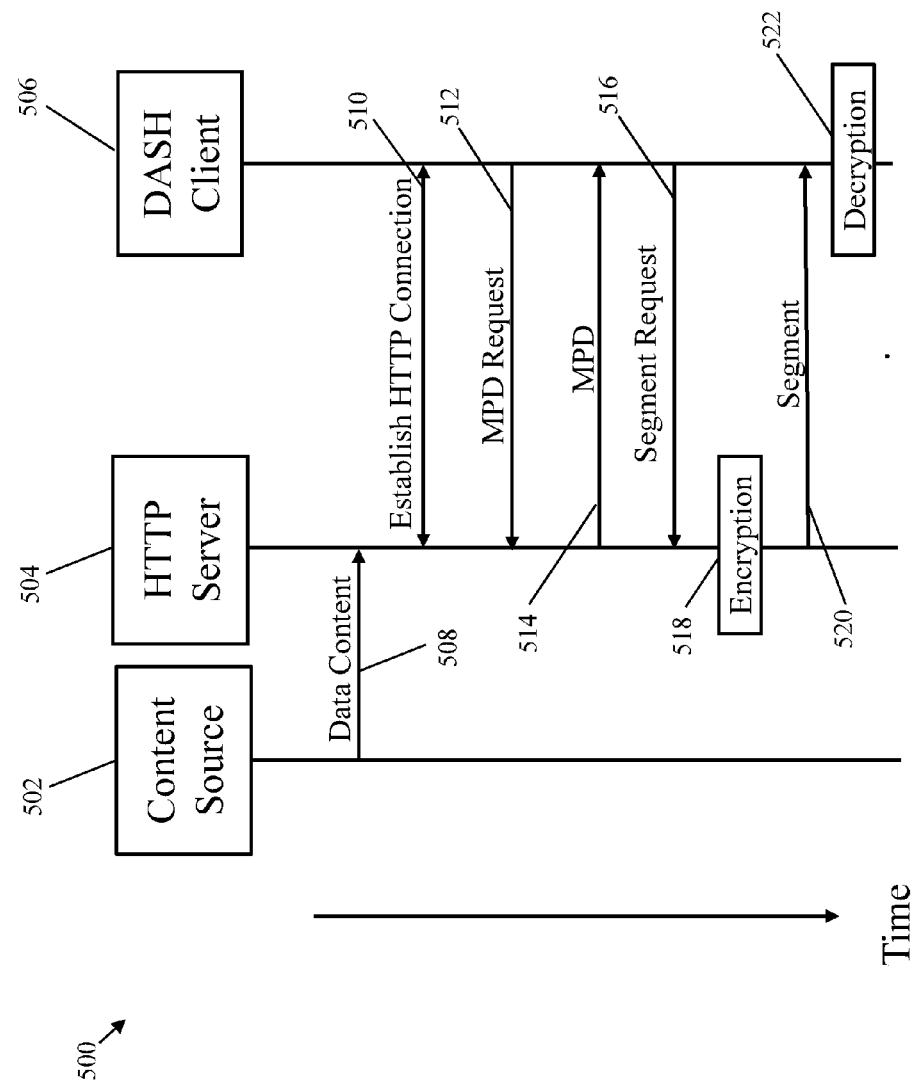
FIG. 5 is a protocol diagram of an embodiment of a DASH service protection method.

FIG. 5 is a protocol diagram of an embodiment of a DASH service protection method 500. In an embodiment a HTTP server 504 may communicate data content with a DASH client 506. At step 508, a HTTP server 504 may receive data content (e.g., a media presentation) from a content source 502. For example, the HTTP server 504 may request and/or download a media presentation from a content source 502. In an embodiment, the data content may not be encrypted. In an alternative embodiment, the data content may be encrypted, such that, the data content may comprise segment encryption, content protection, DRM, or the-like. The data content may be stored onto and/or buffered by the HTTP server 504. At step 510, the HTTP server may establish a data connection with the DASH client, for example, an HTTP or HTTPS connection. For example, The HTTP server 504 and the DASH client 506 may implement an HTTP protocol to establish a data connection between the HTTP server 504 and the DASH client 506.

At step 512, the DASH client 506 may request an MPD by sending (e.g., transmit, upload, etc.) an MPD request to the HTTP server 504. The MPD request may comprise instructions for downloading, or receiving, segments of the data content from the HTTP server 504. Additionally, the MPD request may request decryption instructions. For example, the DASH client 506 may request the HTTP server 504 incorporate an encryption/decryption scheme and/or definitions into the MPD, such as, the service protection encryption as previously discussed with respect to MPD 200 in FIG. 2. At step 514, the HTTP server 504 may then send an MPD to the DASH client 506. For example, the DASH client 506 may receive the MPD from the HTTP server 504 via the DAE (e.g., DAE 118 as shown in FIG. 1), and the DAE may process the MPD in order to construct and/or issue requests from the HTTP server 504 for data content segments. Additionally, the DAE may process the MPD in order to obtain and/or derive one or more keys and IVs from the HTTP server 504 in order to decrypt segments.

At step 516, the DASH client 506 may request a data content segment from the HTTP server 504. For example, as instructed by the MPD, the DASH client 506 may send a segment request for data content to the HTTP server 504 via the DAE. At step 518, in response to receiving a segment request, the HTTP server 504 may process and/or encrypt a segment (e.g., a data content segment and a non-media segment) to send to the DASH client 506. The HTTP server 504 may encrypt the data content segment (e.g., a non-encrypted data content segment or an encrypted data content segment) and one or more non-media segments via a servicing protection encryption method 300, as previously discussed in FIG. 3. Following encryption, the HTTP server 504 may send the encrypted segment to the DASH client 506.

At step 520, the DASH client 506 may receive, process, and/or format the segment. For example, the DASH client 506 may receive the encrypted segment via the DAE, which may receive, process, and/or format the segment. At step 522, upon receiving the encrypted segment, the DASH client may process and/or decrypt the encrypted segment. For example, the DASH client 506 may decrypt the encrypted data segment via a decryption method, such as, decryption method 400 in FIG. 4. During the decryption method, the DASH client 506 may perform one or more additional decryption processes, for example, when the encrypted segment comprises additional layers of data content encryption (e.g., segment encryption, content protection, DRM, or the-like). The DAE may output the decrypted data to the ME (e.g., ME 120 as shown in FIG. 1), which may also perform various functions and output the data to the application 114 in FIG. 1. Additionally, the data derived from the data content segment may be presented (e.g., visually and/or audibly) to a user. For example, after a buffering period, the application 114 may present the data for viewing via the GUI (e.g., GUI 116 as shown in FIG. 1). The DASH client 506 may continue to send segment requests and/or receive encrypted segments from the HTTP server 504, similar to as previously disclosed with respect to steps 516-522.

Figure 6:
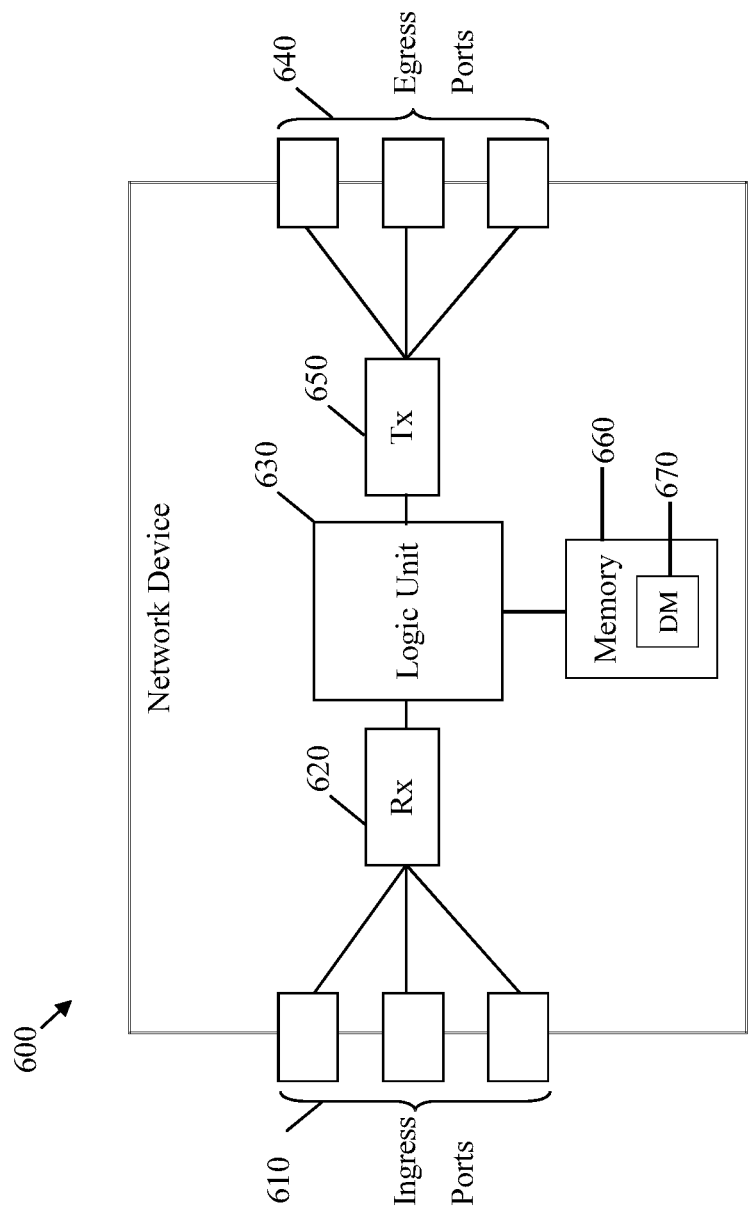
FIG. 6 is a schematic view of an embodiment of a network device.

FIG. 6 is a schematic view of an embodiment of a network device 600. The network device 600 may comprise a plurality of ingress ports 610 and/or receiver (Rx) units 620 for receiving data, a logic unit or processor 630 to process signals, a plurality of egress ports 640 and/or transmitter (Tx) units 650 for transmitting data to other components, and a memory 660. The network device 600 may be suitable for implementing any of the disclosed features, methods, and devices. For example, the network device 600 may be suitable for implementing the HTTP servers 104 and/or the DASH client 108 in FIG. 1.

The logic unit 630, which may be referred to as a central processing unit (CPU), may be in communication with the ingress ports 610, receiver units 620, egress ports 640, transmitter units 650, and memory 660. The logic unit 630 may be implemented as one or more CPU chips, cores (e.g., as a multi-core processor), field-programmable gate arrays (FPGAs), application specific integrated circuits (ASICs), and/or digital signal processors (DSPs), and/or may be part of one or more ASICs.

The memory 660 may be comprised of one or more disks, tape drives, optical disc drives, or solid-state drives; may be used for non-volatile storage of data and as an over-flow data storage device; may be used to store programs when such programs are selected for execution; and may be used to store instructions and data that are read during program execution. The memory 660 may be volatile and/or non-volatile and may be read-only memory (ROM), random-access memory (RAM), ternary content-addressable memory (TCAM), static random-access memory (SRAM), another suitable type of memory, or any combination thereof. The memory 660 may comprise a DM 670, for example, which may be suitable for implementing the server DMs 110 or the client DM 112 as shown in FIG. 1. While the memory 660 is shown as comprising the DM 670, the logic unit 630, or any combination of the logic unit 630, and the memory 660 may alternatively comprise the DM 670. The memory 660 may comprise computer executable instructions that when executed by the logic unit 630 may configure the network device to perform a service protection method, for example, a method as previously disclosed. For example, the memory 660 may comprise computer executable instructions to send/receive an MPD request, to generate an MPD, to send/receive an MPD, to generate an encrypted service protection segment, to send/receive an encrypted service protection segment, and/or any other additional instructions as would be appreciated by one of ordinary skill in the art upon viewing this disclosure. Additionally, the memory 660 may comprise stored data content.

In an embodiment, a DASH apparatus, a system comprising a DASH apparatus, and/or a DASH apparatus employing a service protection method, as disclosed herein or in some portion thereof, may be advantageously employed to provide service-level protection (i.e., full segment encryption) of data content to be communicated between an HTTP server and a DASH client.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   sending a dynamic adaptive streaming over hypertext transfer protocol (DASH) media presentation document (MPD) comprising an essential descriptor, wherein the essential property descriptor comprises a scheme uniform resource name (URN) indicating a location for guidelines and definitions for implementation of a service protection decryption;
   receiving a request for a segment of the MPD, wherein the request comprises instructions for encrypting the segment;
   performing, in response to the request and when digital rights management (DRM) encryption is not present for the segment, content protection encryption by encrypting a data content segment associated with the segment to generate an encrypted data content segment;
   performing, using the scheme URN, after the performing the content protection encryption, and in response to the instructions, service protection encryption by further encrypting the encrypted data content segment to generate an encrypted segment; and
   sending the encrypted segment.

2. The method of claim 1, wherein the performing the content protection encryption comprises using a first key and a first initialization vector (IV).

3. The method of claim 2, wherein the performing the service protection encryption comprises using a second key and a second IV.

4. The method of claim 1, further comprising encapsulating the encrypted data content segment with the encrypted segment.

5. The method of claim 1, further comprising preventing content modification, protecting operator contributions, and enforcing business policies via the service protection encryption.

6. The method of claim 1, wherein the performing the service protection encryption excludes encrypting non-media segments, wherein the non-media segments comprise initialization segments, index segments, and bitstream switching segments.

7. The method of claim 1, wherein the service protection encryption implements Advanced Encryption Standard (AES)-128 cipher block chaining (CBC) encryption.

8. The method of claim 1, further comprising establishing a Hypertext Transfer Protocol (HTTP) connection or an HTTP secure (HTTPS) connection.

9. A method comprising:
   receiving a Dynamic Adaptive Streaming over Hypertext Transfer Protocol (DASH) media presentation description (MPD) comprising an essential property descriptor, wherein the essential property descriptor comprises a scheme uniform resource name (URN) indicating a location for guidelines and definitions for implementation of a service protection decryption;

sending a segment request for a segment of the MPD;

receiving an encrypted segment in response to the segment request;

performing, using the scheme URN, service protection decryption by decrypting the encrypted segment to generate an encrypted data content segment; and performing content protection decryption by decrypting the encrypted data content segment to generate a data content segment.

10. The method of claim 9, wherein the performing the service protection decryption comprises using a second key and a second initialization vector (IV).

11. The method of claim 10, wherein the performing the content protection decryption comprises using a first key and a first IV.

12. The method of claim 11, further comprising obtaining or deriving the first key, the first IV, the second key, and the second IV as instructed by the MPD.

13. The method of claim 9, wherein the encrypted segment encapsulates the encrypted data content segment.

14. The method of claim 9, wherein the service protection decryption implements Advanced Encryption Standard (AES)-128 cipher block chaining (CBC) encryption.

15. The method of claim 9, further comprising establishing a Hypertext Transfer Protocol (HTTP) connection or an HTTP secure (HTTPS) connection.

16. An apparatus comprising:

a transmitter configured to send a segment request for a segment of a dynamic adaptive streaming over hypertext transfer protocol (DASH) media presentation description (MPD);

a receiver configured to:
  receive the DASH MPD, wherein the DASH MPD comprises an essential property descriptor, and wherein the essential property descriptor comprises a scheme uniform resource name (URN) indicating a location for guidelines and definitions for implementation of a service protection decryption;
  receive an encrypted segment in response to the segment request; and a processor coupled to the transmitter and the receiver and configured to:
  perform, using the scheme URN, service protection decryption by decrypting the encrypted segment to generate an encrypted data content segment; and
  perform content protection decryption by decrypting the encrypted data content segment to generate a data content segment.

17. The apparatus of claim 16, wherein the processor is further configured to further perform the service protection decryption using a second key and a second initialization vector (IV).

18. The apparatus of claim 17, wherein the processor is further configured to further perform the content protection decryption using a first key and a first IV.

19. The apparatus of claim 18, wherein the processor is further configured to obtain or derive the first key, the first IV, the second key, and the second IV as instructed by the MPD.

20. The apparatus of claim 6, wherein the encrypted segment encapsulates the encrypted data content segment.

21. The method of claim 1, wherein the performing the service protection encryption comprises encrypting a non-media segment to generate the encrypted segment, and wherein the non-media segment comprises program data, non-playable media, or data that do not change across segments.

* * * * *

UNITED STATES PATENT AND TRADEMARK OFFICE
CERTIFICATE OF CORRECTION

| | | |
|---|---|---|
| PATENT NO. | : 9,646,162 B2 | Page 1 of 1 |
| APPLICATION NO. | : 14/248074 | |
| DATED | : May 9, 2017 | |
| INVENTOR(S) | : Alexander Giladi | |

It is certified that error appears in the above-identified patent and that said Letters Patent is hereby corrected as shown below:

In the Claims

Column 12, Lines 19-40, Claim 1, should read:
1. A method comprising:
    sending a dynamic adaptive streaming over hypertext transfer protocol (DASH) media presentation document (MPD) comprising an essential property descriptor, wherein the essential property descriptor comprises a scheme uniform resource name (URN) indicating a location for guidelines and definitions for implementation of a service protection decryption;
    receiving a request for a segment of the MPD, wherein the request comprises instructions for encrypting the segment;
    performing, in response to the request and when digital rights management (DRM) encryption is not present for the segment, content protection encryption by encrypting a data content segment associated with the segment to generate an encrypted data content segment;
    performing, using the scheme URN, after the performing the content protection encryption, and in response to the instructions, service protection encryption by further encrypting the encrypted data content segment to generate an encrypted segment; and
    sending the encrypted segment.

Column 14, Lines 29-30, Claim 20, should read:
20. The apparatus of claim 16, wherein the encrypted segment encapsulates the encrypted data content segment.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*